United States Patent

[11] 3,634,724

| [72] | Inventor | Gary W. Vest<br>4480 Broadview Road, Cleveland, Ohio 44109 |
|---|---|---|
| [21] | Appl. No. | 858,316 |
| [22] | Filed | Sept. 16, 1969 |
| [45] | Patented | Jan. 11, 1972 |

[54] AUTO THEFT PREVENTION SYSTEM
9 Claims, 12 Drawing Figs.

[52] U.S. Cl. .................................................. 315/209,
123/146.5, 180/114, 307/10
[51] Int. Cl. ..................................................... B60r 25/00,
H05b 37/02
[50] Field of Search .......................................... 123/146.5
B; 180/114; 315/209; 307/10

[56] References Cited
UNITED STATES PATENTS
3,439,771 4/1969 Commins ..................... 180/114

*Primary Examiner*—John Kominski
*Assistant Examiner*—Lawrence J. Dahl
*Attorney*—McCoy, Greene & Howell ABSTRACT: An auto theft prevention circuit in an ignition circuit, the theft prevention circuit including an impedance and switch means for connecting the impedance in parallel with one of the passive components of the ignition circuit, this theft prevention circuit downgrades the ignition capabilities and thus prevents or retards performance of the engine to a degree sufficient to prevent the vehicle from moving.

INVENTOR
GARY W. VEST

INVENTOR
GARY W. VEST

AUTO THEFT PREVENTION SYSTEM

Various types of auto theft prevention circuits are well known in the art. These types fall generally into two categories, one in which a theft prevention switch opens a series portion of an ignition circuit and another in which a theft prevention switch connects an additional impedance element into the ignition circuit. Either of these types of theft prevent circuits can be foiled by jumpering. With the one type, a jumper across the auto theft switch contacts completes the series ignition circuit. With the other type, a jumpering of the addition impedance element permits normal operation of the ignition circuit. It is an object of this invention to provide a theft prevent circuit which cannot be foiled by jumpering.

Another object of this invention is to provide an ignition system with an antitheft circuit which is inexpensive, easy to install and employs a minimum of parts.

Yet another object of this invention is to provide an ignition system with an antitheft circuit which will not discharge the vehicle battery and cannot cause damage to any of the ignition system components when being used.

Briefly, in accordance with aspects of the invention, an antitheft circuit is provided which includes an impedance element and a switch for connecting this impedance element in parallel with one of the passive elements of the standard ignition circuit. The impedance element reacts upon the inductively generated voltage waveforms of the ignition system in a manner so as to create a downgrading effect upon the ignition circuit operation.

Thus, the would-be thief is unable to start the car and cannot do so by jumpering. Further, because the motor will crank, the would-be thief will not suspect that an antitheft circuit is installed.

These and various other objects, features and advantages of the invention will be more clearly understood from a reading of the specification in conjunction with the drawings in which:

DETAILED DESCRIPTION OF THE INVENTION

Figure 1:
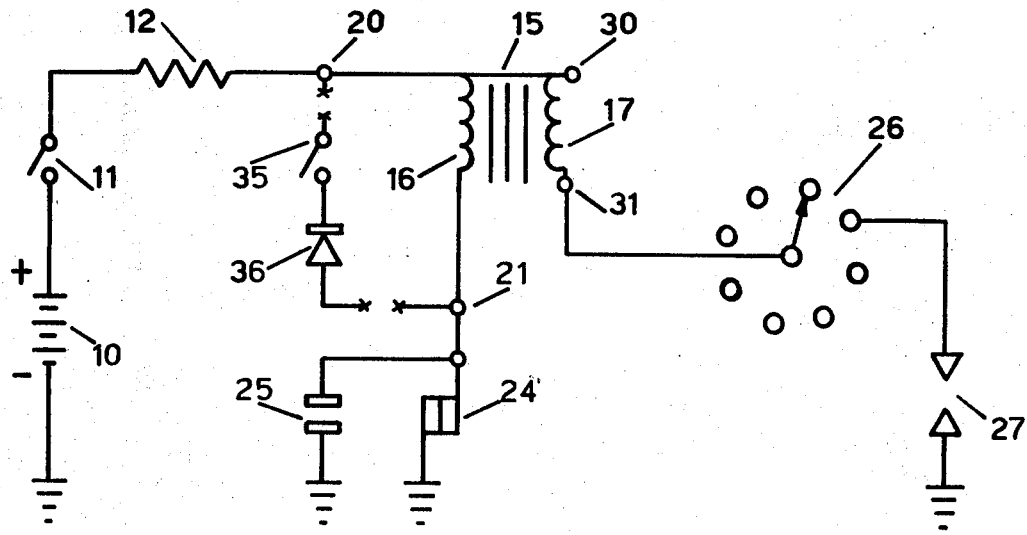
FIG. 1 is a schematic representation of an automobile ignition system, and showing one embodiment of the theft prevention circuit.

Referring now to the drawings, FIG. 1 is a schematic representation of one conventional ignition system and a schematic representation of one embodiment of the invention. The conventional ignition system includes a battery 10, a conventional ignition switch 11, and a transformer 15, having a primary winding 16 and a secondary winding 17. The primary winding 16 has terminals 20 and 21. The conventional ignition system also includes breaker points 24, capacitor 25 and distributor 26. For simplicity, only a single spark plug 27 is shown connected to distributor 26. Secondary winding 17 has terminals 30 and 31.

The primary winding terminal 20 is connected to the resistor 12 and the other primary winding terminal 21 is connected through the conventional circuit breaker points 24 to ground, thus completing the primary circuit to the battery 10. A capacitor 25 is connected in parallel with the circuit breaker contacts 24 in a manner well known in the art. The transformer 15 includes a secondary winding 17 which is connected to a conventional distributor 26, and a single spark plug is illustrated at 27 connected to one of the distributor contacts. It is understood that the distributor has an identical number of contacts as the number of spark plugs and that each of the spark plugs is connected through an individual one of the distributor contacts. The secondary winding 17 has one of its terminals connected to the primary winding terminal 20 and the other terminal 31 connected to the distributor arm of the distributor 26.

All of the above-described components are connected in a typical manner. The one embodiment of theft prevention circuit shown in FIG. 1 is represented as being connected between terminals 20 and 21 of the primary winding 16. This embodiment includes a theft prevention switch 35 shown in its normally open condition and unilateral impedance 36 which is serially connected to the theft prevent switch 35. When this theft prevention circuit is installed and the switch 35 is closed, it constitutes a complete series path between terminals 20 and 21 and effectively connects the diode 36 in parallel with the primary winding 16. When the theft prevention switch 35 is closed by the operator as he leaves the vehicle, the completion of the ignition circuit by jumpering the normal ignition switch 11 will permit the engine to be cranked, but because of the bypath through the diode 36, insufficient voltage will be developed across the primary winding 16 to induce sufficient voltage in the secondary winding to cause the spark plugs to ignite the gasoline and therefore, the engine will not fire. Because, however, the engine does crank, the thief or would-be thief will be unaware that a theft prevention circuit is being employed.

Further, even though the would-be thief attempts to jumper various portions of the ignition circuit, and even if he were to jumper between terminals 20 and 21, he would still be unable to start the engine because this jumpering will further reduce the voltage being developed across the primary winding. Diode 36 is a preferred embodiment because of its voltage responsive characteristics. It does not break down and conduct until the voltage exceeds a predetermined minimum value and it is a relatively compact component which can be easily concealed.

Figure 2:
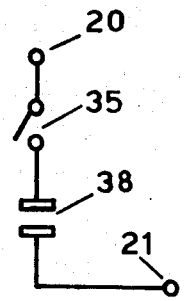
FIGS. 2 through 11 are alternative embodiments of theft prevention circuits which may be employed in the ignition circuit (FIG. 1)

FIG. 2 constitutes an alternative embodiment of theft prevent circuits in which a capacitor 38 may be serially connected in parallel with the primary winding 16 when the theft prevention switch 35 is closed.

Because capacitor 38 is normally on the order of at least five times larger in value than existing ignition system capacitor 25, it changes the effective ringing frequency of the ignition circuit which results in the voltage induced in the secondary winding 17 being considerably lowered, and is in fact, reduced below that value sufficient to produce ignition in the chambers which include the spark plugs, such as spark plug 27.

Figure 3:
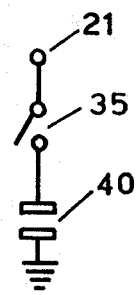
Figure 4:
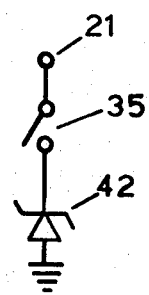
Figure 5:
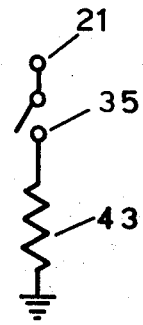

FIGS. 3, 4, and 5 are alternative embodiments of theft prevention circuits which can be connected between terminal 21 and ground.

In the instance of FIG. 3, a capacitor 40 is connected to ground and to the antitheft switch 35, such that when switch 35 is closed the capacitor effectively reduces the voltage developed across the primary winding to a value insufficient to establish ignition. With respect to this embodiment the additional capacitor 40 effectively changes the ignition system capacity (which would otherwise be equal to the capacitance of the capacitor 25) and thereby changes the amplitude and frequency of the inductively generated ringing voltage of the ignition circuit resulting in reduced voltage levels being induced in the secondary winding 17.

In the instance of FIG. 4, a diode 42 has one terminal connected to ground and the other terminal connected to the theft prevention switch 35, which in turn is connected to the terminal 21. The function of this circuit is similar to the one shown in FIG. 1 except in this case a low-reverse-breakdown-voltage-type diode 42, such as a zener diode is used.

When the voltage level at point 21 reaches the breakdown voltage level of the diode, it will begin conducting and bypass the current around capacitor 25 and breaker points 24, thus limiting the voltage developed across the primary winding 16 to a value insufficient to establish ignition.

In the instance of FIG. 5, a resistor 43 has one terminal connected to ground and its other terminal connected to the theft prevention switch 35 which in turn is connected to terminal 21. With this embodiment direct current will be bypassed from terminal 20 to ground. Further, the ringing current generated across primary winding 16 would be materially reduced and resistor 43 will also conduct pulsating current to ground.

Figure 6:
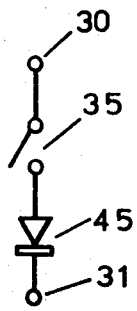
Figure 7:
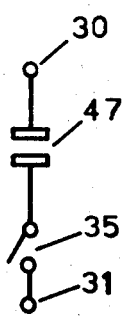

The embodiments of FIGS. 6 and 7 are alternatives of the theft prevention circuit which may be connected between terminals 30 and 31 of the secondary winding 17 of transformer 15, or equally effectively may be connected from secondary terminal 31 to ground. In this particular illustration, they are shown connected between terminals 30 and 31.

In FIG. 6, diode 45 is serially connected between terminals 30, 31 when switch 35 is closed diode 45 effectively bypasses a portion of the current around secondary winding 17, thereby preventing sufficient voltage to be developed to cause ignition in the spark plugs. Because the normal voltage pulses across the secondary winding 17 are much higher than across the primary winding, it is necessary that diode 45 have a high-voltage low-current rating as compared to diode 36. Diode 36 would necessarily be subject to a much lower voltage and higher current.

Still another embodiment of the invention is shown in FIG. 7 in which a capacitor 47 is capable of being serially connected between terminals 30 and 31 by the closing of theft prevention circuit 35. In this particular embodiment, the capacitor 47 will then be connected in parallel with the secondary winding 17 to reduce the effective voltage induced in the secondary winding be effectively detuning this secondary winding..... Again, the effect of the parallel connected component 47 will be to permit the engine to be cranked while preventing ignition in the cylinders because of diminished voltage applied across the secondary winding 17.

Figure 8:
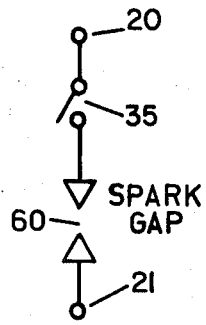

A further embodiment is shown in FIG. 8 in which a spark gap 60 is capable of being connected in parallel with primary winding 16 by the closing of the theft prevention switch 35. In this particular embodiment, the spark gap distance is set such that its threshold level of conduction is lower than the voltage required to obtain a spark across the spark plugs, not shown. Because the voltage across secondary winding 17 will be much higher than across the primary winding, it is practical for spark gap 60 to be connected across terminals 30 and 31, and to have a wider gap spacing than that required when it is connected across terminals 20 and 21. When pulses are produced in the primary winding 16, the spark gap will discharge and bypass the current preventing the secondary voltage level from reaching sufficient magnitude to produce ignition in the chambers.

Figure 9:
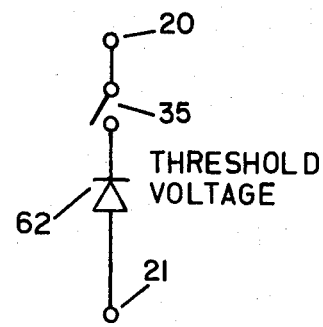

FIG. 9 shows an alternative embodiment of theft prevention circuit in the form of a threshold voltage diode 62 capable of being connected in parallel with primary winding 16 by the operation of switch 35. With this embodiment in the ignition circuit of FIG. 1, the voltage across the primary winding 16 is permitted to build up until it reaches a predetermined level corresponding to the threshold voltage of diode 62. At this voltage, diode 62 effectively becomes a low resistance path effectively reducing the voltage developed across the primary winding 16 to therefore prevent proper ignition in the cylinders.

Figure 10:
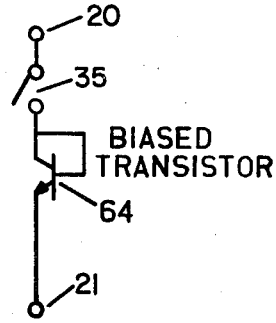
Figure 11:
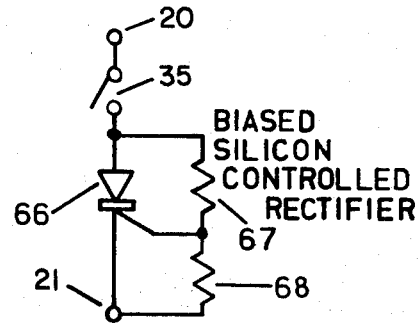

The embodiments of FIGS. 10 and 11 constitute biased semiconductors which can be employed in the ignition circuit of FIG. 1 as theft prevention circuits. FIG. 10 includes a biased transistor 64 which can be connected by switch 35 in parallel with winding 16. The voltage at which conduction begins through the biased transistor 64 is determined by the type of transistor and the amount of bias. The ultimate result, however, is to bypass the current around primary winding 16 and thereby prevent ignition.

FIG. 11 is an ignition circuit including a biased silicon-controlled rectifier 66, the bias level of which is controlled by a pair of resistors 67, 68. This type of theft prevention circuit can also be connected in the embodiment of FIG. 8 by means of switch 35 to effectively reducing the voltage developed across the primary winding 16 thus preventing ignition. The exact point of conduction of the rectifier can be controlled by varying the values of resistors 67, 68.

From the foregoing explanation, it is apparent that each of the antitheft circuits constitutes a parallel path around one or more of the standard ignition circuits components to thus reduce the effective voltage to a value insufficient to produce ignition in the combustion chambers. Further, jumpering of these circuits will have no effect upon the ignition system, at least to the point of permitting ignition. Still further, it is apparent that unilateral impedance such as diodes 36, 42 and 45 may be employed as the passive element of the theft prevention circuit or bilateral impedances such as capacitors 38, 40 and 47 may be employed.

Figure 12:
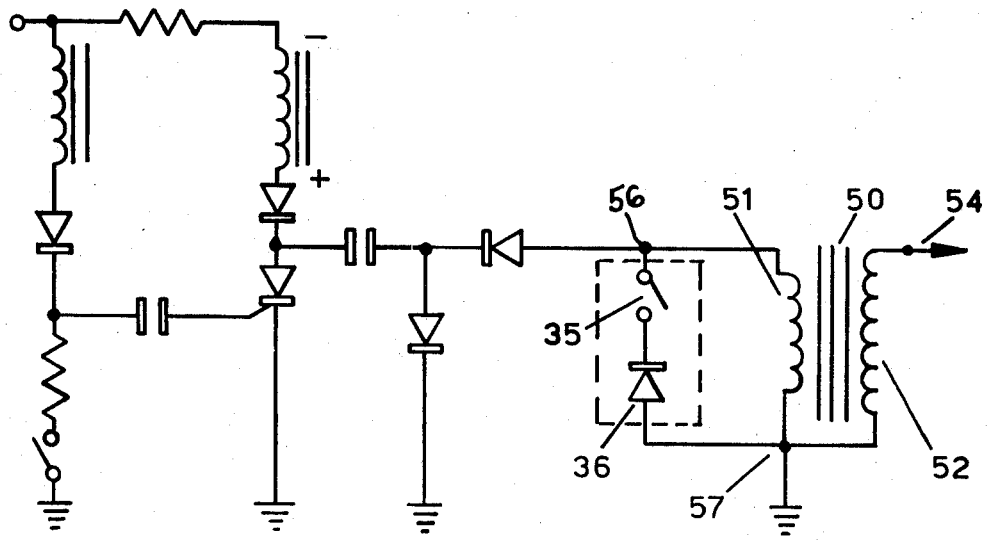
FIG. 12 is an alternative embodiment of ignition circuit.

FIG. 12 is a known type of capacitor discharge ignition circuit to which an embodiment of this invention has been added. This ignition circuit is shown in FIG. 7–98 on Page 7–111 of The Silicon Controlled Rectifier Designer's Handbook, published by Westinghouse in 1963. Basically, this system charges a capacitor to a high voltage, and through the operation of the silicon-controlled rectifier, discharges the capacitor so that the discharge voltage is produced across the primary winding 51 of the step up pulse transformer 50. The theft prevention circuit includes switch 35 and a diode 36 which is connected between the switch 35 in parallel with the primary winding 51. When switch 35 is closed, diode 36 effectively bypasses the primary winding 51 to prevent the buildup of sufficient voltage in the secondary winding 52 to produce ignition in the associated spark plugs, not shown, but connected through a conventional distributor to the secondary winding 52.

It will be understood by those skilled in the art that the embodiments of FIGS. 2 through 11 can be substituted in the ignition circuit of FIG. 12 between terminals 56, 57 or between terminals 54, 57.

While I have shown and described several illustrative embodiments of my invention, it is understood that the concept thereof can be employed in other embodiments without departing from the spirit and scope of this invention.

I claim:

1. In an ignition circuit including a distributor having a set of contacts, a plurality of spark plugs operatively connected to said distributor, a voltage supply source and at least one electrical component operatively connected between said voltage supply source and said distributor for causing a sparking voltage for said spark plugs sufficient to cause and maintain engine firing, the improvement which comprises:
   a theft prevention circuit including a reactive circuit component and switch means for connecting said reactive component in parallel with said ignition circuit whereby said theft prevention circuit is effective to limit the level of any transient surge of sparking voltage developed across said ignition circuit electrical component sufficiently to prevent said spark plugs from maintaining engine firing.

2. A theft prevention circuit according to claim 1 wherein said reactive circuit component is a capacitor.

3. In an ignition circuit including a distributor having a set of contacts, a plurality of spark plugs operatively connected to said distributor, a voltage supply source and at least one electrical component operatively connected between said voltage supply source and said distributor for causing a sparking voltage for said spark plugs sufficient to cause and maintain engine firing, the improvement which comprises:
   a theft prevention circuit including a unilateral impedance component and switch means for connecting said unilateral impedance component in parallel with said ignition circuit whereby said theft prevention circuit is effective to limit the level of any transient surge of sparking voltage developed across said ignition circuit electrical component sufficiently to prevent said spark plugs from maintaining engine firing.

4. A theft prevention circuit according to claim 3 wherein said unilateral impedance is a semiconductor device.

5. A theft prevention circuit according to claim 3 wherein said unilateral impedance is a threshold voltage level conducting device.

6. A theft prevention circuit according to claim 3 wherein said unilateral impedance is a threshhold-biased semiconductor.

7. A theft prevention circuit according to claim 6 wherein said semiconductor is a transistor.

8. A theft prevention circuit according to claim 6 wherein said semiconductor is a silicon-controlled rectifier.

9. In an ignition circuit including a distributor having a set of contacts, a plurality of spark plugs operatively connected to said distributor, a voltage supply source and at least one electrical component operatively connected between said voltage supply source and said distributor for causing a sparking voltage for said spark plugs sufficient to cause and maintain engine firing, the improvement which comprises:
   a theft prevention circuit including a diode and switch means for connecting said diode in parallel with said ignition circuit component whereby said theft prevention circuit is effective to limit the level of any negative transient surge of sparking voltage developed across said ignition circuit electrical component sufficiently to prevent said spark plugs from maintaining engine firing.

* * * * *